United States Patent [19]

Lehtola

[11] Patent Number: 5,065,857
[45] Date of Patent: Nov. 19, 1991

[54] METHOD IN HANDLING OF RETURNABLE BOTTLES AND DEVICE FOR HANDLING OF RETURNABLE BOTTLES

[75] Inventor: Raimo Lehtola, Kouvola, Finland
[73] Assignee: Halton OY, Finland
[21] Appl. No.: 543,774
[22] PCT Filed: Nov. 15, 1989
[86] PCT No.: PCT/FI89/00210
  § 371 Date: Jul. 18, 1990
  § 102(e) Date: Jul. 18, 1990
[87] PCT Pub. No.: WO90/06274
  PCT Pub. Date: Jun. 14, 1990

[30] Foreign Application Priority Data
  Dec. 2, 1988 [FI] Finland ............... 885637

[51] Int. Cl.⁵ .............................. B65G 47/04
[52] U.S. Cl. .................. 198/457; 198/540; 198/550.01
[58] Field of Search ............ 198/457, 540, 560, 723, 198/690.2, 607, 624, 550.01

[56] References Cited

U.S. PATENT DOCUMENTS

| | | | |
|---|---|---|---|
| 1,574,914 | 3/1926 | McNamara | 198/457 |
| 2,854,125 | 9/1958 | Johnson | 198/457 |
| 3,363,741 | 1/1968 | Dierksheide | 198/457 X |
| 3,367,534 | 2/1968 | Carter | 198/457 X |

FOREIGN PATENT DOCUMENTS

| | | | |
|---|---|---|---|
| 2104691 | 4/1972 | France. | |
| 2112157 | 6/1972 | France. | |
| 2132536 | 11/1972 | France. | |
| 2234216 | 1/1975 | France. | |
| 2267264 | 11/1975 | France. | |
| 1031334 | 6/1966 | United Kingdom | 198/690.2 |
| 2120625 | 12/1983 | United Kingdom. | |

Primary Examiner—Joseph E. Valenza
Assistant Examiner—Keith L. Dixon
Attorney, Agent, or Firm—Steinberg & Raskin

[57] ABSTRACT

The invention concerns a method in handling of returnable bottles (P), wherein the returnable bottle is dropped vertically from an upper space ($E_1$) into a lower space ($E_2$) and wherein the returnable bottle is transferred from the drop space ($C_1$) placed underneath the tube (11) further to a new storage position. According to the invention, the returnable bottle is dropped from the tube (11) into the space between the bristles (12a) in the transfer brush (12) and the guide part (17) and transferred out of said drop space ($C_1$) further away, being shifted by the bristles (12a) or equivalent in the rotatable brush (12). The invention also concerns a device for handling of returnable bottles.

6 Claims, 3 Drawing Sheets

METHOD IN HANDLING OF RETURNABLE BOTTLES AND DEVICE FOR HANDLING OF RETURNABLE BOTTLES

The invention concerns a method in handling of returnable bottles and a device for handling of returnable bottles.

From prior art, a method for handling of returnable bottles is known wherein the returnable bottle is dropped from an upper shop space into a lower storage space vertically through a tube. In said arrangement, a problem consists of the further transfer of the returnable bottles from the position below the tube onto a storage table or to some other, corresponding storage space. Various revolving table solutions are known, from which the returnable bottle is transferred further off onto a conveyor.

From the point of view of the construction, the prior art solutions are not particularly advantageous. The cost of equipment becomes high when various counterparts are employed for the shifting-off of the bottles.

Thus, the object of the present invention is to provide an improvement for said problem of shifting off.

The object of the invention has been achieved by means of a solution of equipment wherein it has been realized to use a rotatable brush for further transfer of the bottles.

The method in accordance with the invention is mainly characterized in that the returnable bottle is dropped through the tube into the space between the bristles in a transfer brush and a guide part and transferred out of said drop space further away, being shifted by the bristles or equivalent in the rotatable brush.

The device in accordance with the invention is mainly characterized in that, in a position below the tube, the device comprises a brush, by means of whose rotation the returnable bottle, which has fallen down through the tube, is transferred away from the position underneath the tube.

In the following, the invention will be described with reference to some preferred embodiments of the invention illustrated in the figures in the accompanying drawings, the invention being, however, not supposed to be confined to said embodiments alone.

Figure 1A:
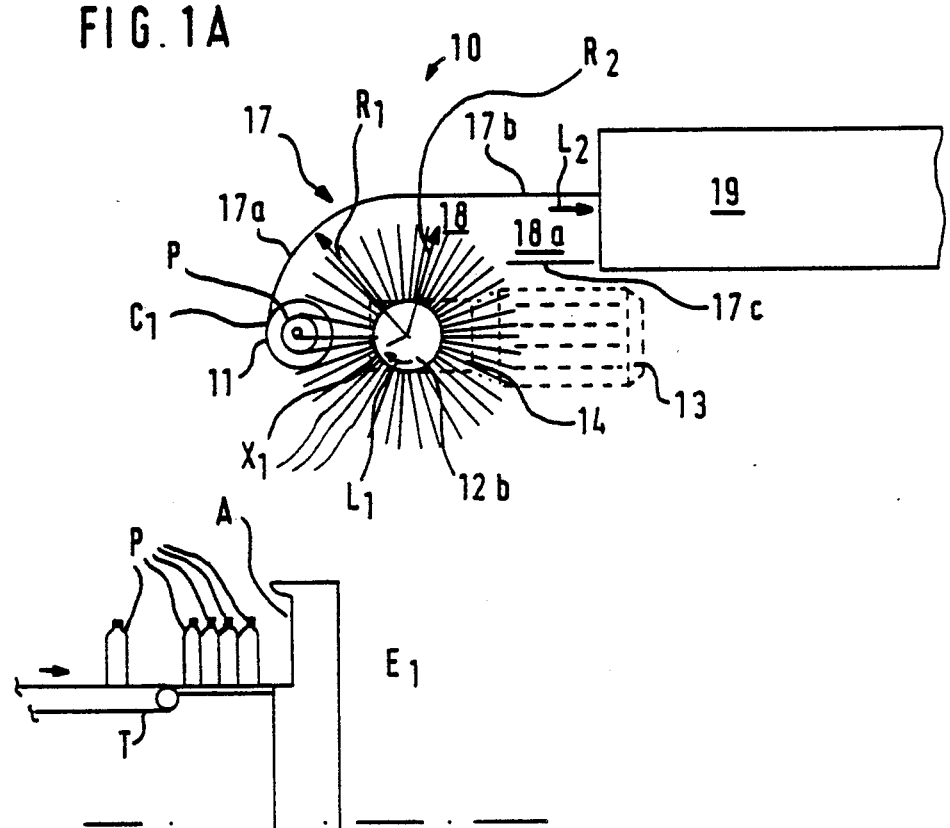
FIG. 1A shows a first advantageous embodiment of the device in accordance with the invention viewed from above.

FIG. 1A shows a device 10 in accordance with the invention for handling of returnable bottles. The returnable bottle is dropped from an upper space into a lower space vertically through a dropping tube 11. In the solution in accordance with the invention the returnable bottle P is dropped into a drop space $C_1$ placed between the bristles 12a in a transfer brush 12 and the curved guide part 17a of a guide 17. The transfer brush 12 is rotated by rotating the shaft 12b of the transfer brush 12 by means of a drive motor 13 by the intermediate of a transmission 14, advantageously a bevel gear. The output shaft 15 of the transmission 14 is connected to the shaft 12b of the brush 12 by means of coupling flanges 16a,16b (in FIG. 1B).

The shaft 12b of the brush 12 is rotated around its geometric axis $X_1$ by means of the drive motor 13. The axes of the bristles 12a in the brush 12 are placed substantially perpendicularly to the geometric axis $X_1$.

The guide 17 comprises a curved guide part 17a and a connected straight guide part 17b. The curve radius $R_1$ of the guide 17 is substantially equal to the distance $R_2$ of the ends of the bristles 12a in the transfer brush 12 from the geometric axis $X_1$. The brush 12 is fitted so in relation to the guide 17 that the ends of the bristles 12a in the brush 12 are placed at a certain distance from the curved guide part 17a of the guide 17. Thus, when the transfer brush 12 is rotated in the direction indicated by the arrow $L_1$, the returnable bottle P is shifted from the position underneath the tube 11 forwards on the table 18 and, guided by the guide 17, further on the table 18 into the space 18a between the guide parts 17b and 17d. When the next bottle P is dropped along the dropping tube 11 to the position $C_1$ underneath the tube 11 on the table 18, being shifted forwards by means of the constantly rotated transfer brush 12, said returnable bottle P meets the returnable bottle already present on the table 18 and pushes this bottle forwards. Thus, each new bottle pushes the row of bottles placed ahead of it towards the conveyor 19.

The conveyor 19 is advantageously an endless belt conveyor, which is rotated by means of an electric motor of its own.

Being transferred by the conveyor 19, the returnable bottles P are shifted onto a table 20 or to some other storage position.

Figure 1B:
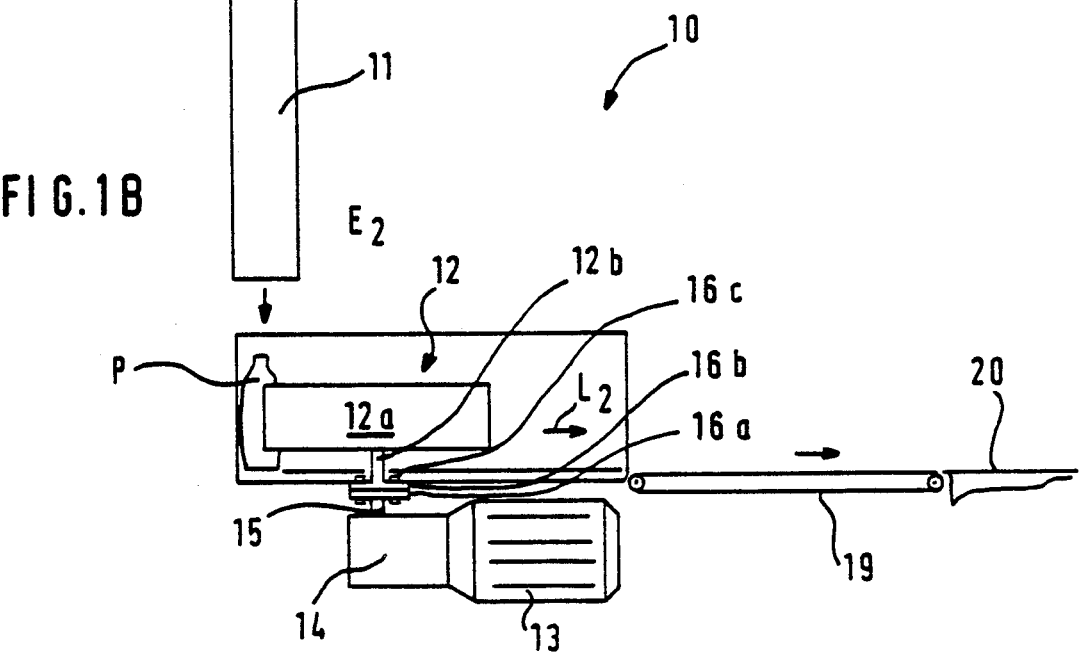
FIG. 1B is a partly schematical side view of the device in accordance with the invention shown in FIG. 1.

FIG. 1B is a side view of the device shown in FIG. 1A. As is shown in FIG. 1B, the lower end of the dropping tube 11 is placed in the downstairs space $E_2$ and, correspondingly, the upper end of said tube is placed in the upstairs space $E_1$. In the space $E_1$, there may be, e.g., a removing conveyor T for the bottle receiving device, by whose means the bottles are fed through a side opening A provided at the upper end of the tube 11 into the tube 11. Thus, the returnable bottles fall in the tube 11 vertically, by the force of gravity, and freely into the lower space $E_2$, and further onto the table 18 into the drop space $C_1$ placed underneath the lower end of the tube 11. Each returnable bottle P is dropped through the tube 11 into the space between the lines of bristles in the transfer brush 12. The bristles 12a in the transfer brush 12 are of a resilient material, e.g. nylon. The bristles 12a in the transfer brush 12 attenuate the falling of the bottle onto the table 18. The transfer brush 12 is rotated constantly by means of the motor 13, and the bottle that has fallen down into the space $C_1$ moves immediately on the table 18, being guided by the guide 17, in the way shown by the arrow $L_2$, onto the conveyor 19 and from the conveyor 19 further onto the table 20 or to some other storage position.

In the way shown in FIG. 1B, the output shaft (not shown) of the drive motor 13 is connected to the transmission 14, and the output shaft 15 of the transmission 14 is connected to the coupling flange 16a. The coupling flange 16a is further connected by means of screws 16c to the other coupling flange 16b, which is fixed permanently to the shaft 12b of the brush 12. Thus, the brush 12 is rotated by means of the motor 13. After a certain period of operation, the brush 12 may be turned around, whereby the service life of the brush can be extended.

Figure 1C:
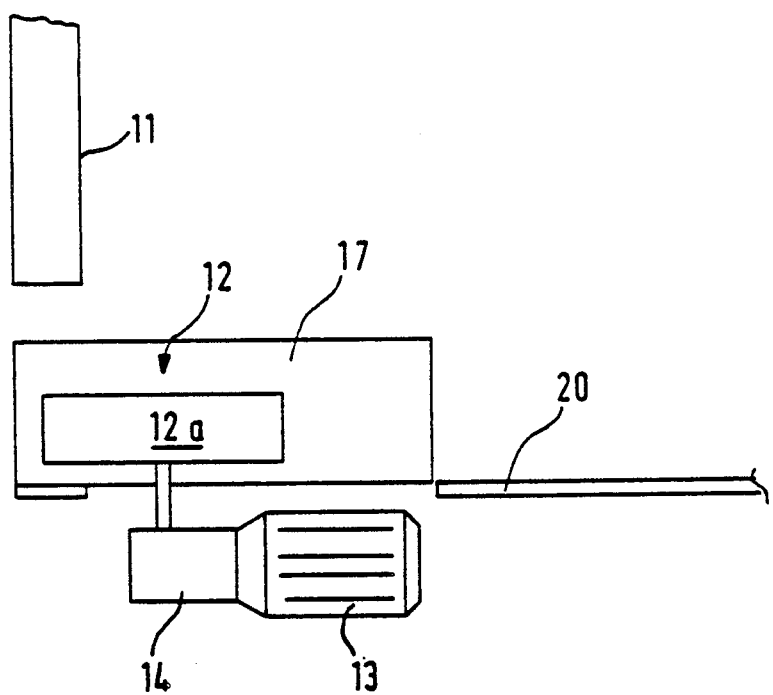
FIG. 1C is a side view of a second embodiment of the device in accordance with the invention.

FIG. 1C is a side view of a second advantageous embodiment of the arrangement in accordance with the invention. In the embodiment shown in FIG. 1C, the returnable bottle P is transferred directly from the table 18 onto the storage table 20.

Figure 2A:
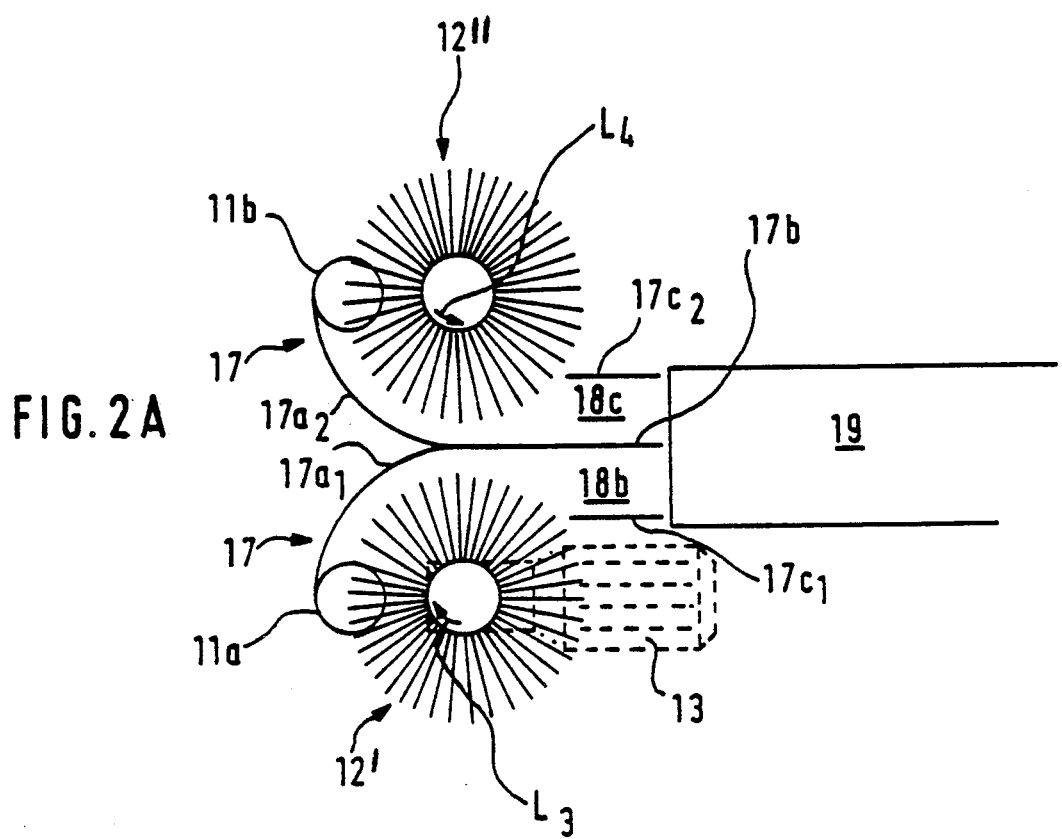
FIG. 2A shows a third embodiment of the device in accordance with the invention viewed from above.

FIG. 2A shows a third advantageous embodiment of the invention viewed from above. In the embodiment shown in FIG. 2A, the equipment comprises two dropping tubes, tubes 11a and 11b, for bottles of different sizes. Small bottles are dropped through the tube 11a, and larger bottles are dropped through the tube 11b. Further the equipment comprises two brushes, the brushes 12' and 12" and the related guides 17, which comprises the guide portions $17a_1, 17a_2$; $17b;17c_1$ and $17c_2$. Between the straight portion 17b of the guide 17 and the guide portion $17c_1$, a passage 18b is formed, and between the guide portion 17b and the guide portion $17c_2$, a passage 18c is formed. The brushes 12' and 12" placed underneath the tubes 11a and 11b are fitted to revolve in the directions indicated by the arrows $L_3$ and $L_4$. One brush 12' is rotated clockwise, and the other brush 12" is rotated counterclockwise. The rotating of the brushes 12' and 12" takes place by means of the same motor 13 with arrangement of equipment illustrated in more detail in FIG. 2B. At the ends of the passages 18a and 18b. a conveyor 19 is fitted, which is fitted to transfer the returnable bottles P arriving from each passage further onto a sorting table or to some other storage position.

Figure 2B:
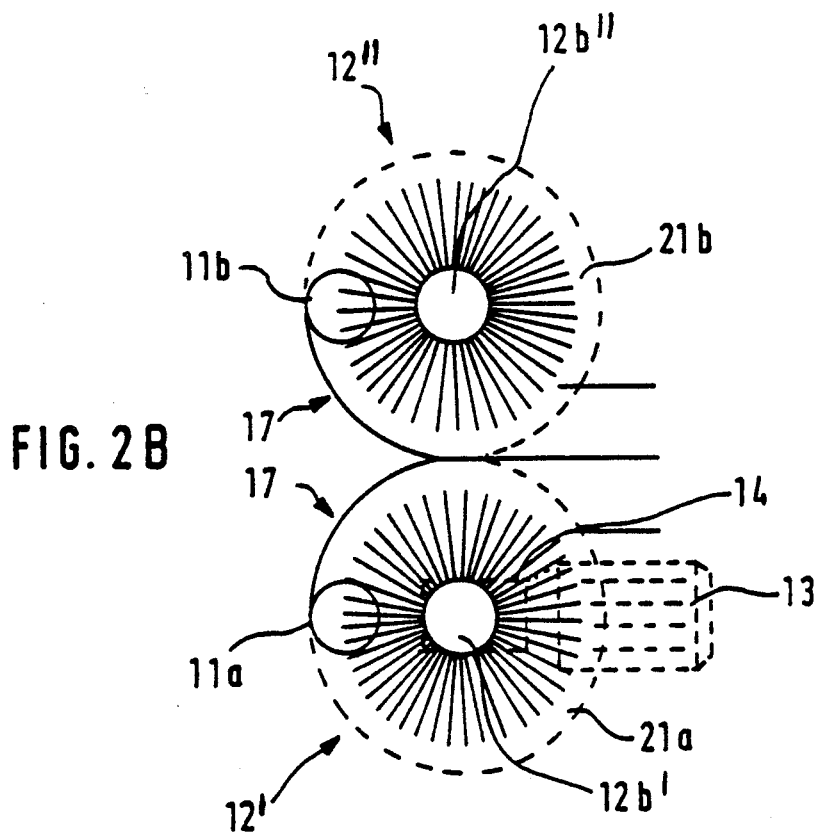
FIG. 2B shows an advantageous solution of the drive of the brushes as shown in FIG. 2A viewed from above.

FIG. 2B shows the drive arrangement of the device as shown in FIG. 2A. As is shown in FIG. 2B, the equipment comprises a drive wheel 21a, advantageously a cogwheel, connected to the shaft 12b' of the brush 12', and correspondingly a drive wheel 21b, advantageously also a cogwheel, connected to the shaft of rotation 12b" of the brush 12". The shaft 12' is rotated by means of an electric motor 13 by the intermediate of a transmission 14, as is shown in FIG. 1B. The wheel 21a is in operational engagement with the wheel 21b and rotates the shaft 12b"connected to said wheel. Thus, both of the brushes 12' and 12' ∝ are rotated by means of one drive unit 13.

The movement of rotation may also be transferred from one shaft to the other by means of a V-belt, a flat belt, a cogged belt, or a chain.

What is claimed is:

1. A method for handling returnable bottles from an upper shop space into a lower storage space comprising
    arranging a dropping tube vertically such that an upper end of the tube is adjacent to an upper shop space and a lower end of the tube communicates with a lower drop space,
    feeding a plurality of returnable bottles into said upper shop space such that the bottles are fed into the tube freely fall by the force of gravity through the tube to said lower drop space,
    providing said lower drop space with a rotatable transfer brush having a plurality of bristles such that each bottle falls into a space between said bristles,
    rotating said brush such that after each bottle lands between said bristles in said lower drop space, said bottle is displaced from a location under said tube, such that the next bottle may fall freely into a space between said bristles under said tube, and
    guiding each bottle out of said lower drop space and into a new storage area via a curved guide part which guides the bottles onto a conveyor.

2. The method of claim 1, further comprising constantly rotating a shaft of said brush by means of a motor.

3. The method of claim 1, further comprising providing two dropping tubes, dropping smaller bottles through one tube, dropping larger bottles through said other tube, providing a brush disposed under each dropping tube, and operating both of said brushes by means of the same drive unit.

4. A device for transferring returnable bottles from an upper shop space to a lower drop space comprising
    an upper shop space,
    a lower drop space,
    a dropping tube vertically arranged such that an upper end of the tube is adjacent to said upper shop space and a lower end of said tube communicates with said lower drop space,
    means for feeding a plurality of returnable bottles from said upper shop space into said tube such that the bottles freely fall by the force of gravity through said tube to said lower drop space,
    said lower drop space equipped with a rotatable transfer brush having a plurality of bristles, said brush being arranged such that the bottles are able to fall into a space between said bristles,
    rotating means for constantly rotating said brush such that each bottles which has fallen through said tube is transferred away from a position underneath said tube, such that the next bottle may fall into a space between said bristles under said tube,
    conveying means for conveying said falling bottles away from said lower drop space to a new storage area,
    guide means for guiding each bottle to said new storage area, said guide means being equipped with a curved guide part which guides the bottles onto said conveying means.

5. The device of claim 4, wherein said rotating means comprises a drive motor which rotates said brush and which is fitted to rotate a shaft of said brush via an intermediate transmission.

6. The device of claim 5, which includes a second tube and a second brush associated with said second tube, further comprising a first drive wheel connected to said shaft of said brush and fitted in operational engagement with a second drive wheel connected to a second shaft connected to said second brush, said drive motor rotating both shafts of the brushes such that bottles which have fallen through said tubes are transferred to a new storage position.

* * * * *